(12) United States Patent
Sullivan et al.

(10) Patent No.: US 10,877,825 B2
(45) Date of Patent: Dec. 29, 2020

(54) SYSTEM FOR OFFLINE OBJECT BASED STORAGE AND MOCKING OF REST RESPONSES

(71) Applicant: ORACLE INTERNATIONAL CORPORATION, Redwood Shores, CA (US)

(72) Inventors: Blake Sullivan, Redwood City, CA (US); Kentaro Kinebuchi, San Francisco, CA (US); Jing Wu, Foster City, CA (US); Min Lu, Fremont, CA (US); Andrew Schwartz, Newton, MA (US); Max Starets, Lexington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/439,420

(22) Filed: Jun. 12, 2019

(65) Prior Publication Data
US 2020/0110644 A1 Apr. 9, 2020

Related U.S. Application Data

(60) Provisional application No. 62/741,135, filed on Oct. 4, 2018.

(51) Int. Cl.
*G06F 3/00* (2006.01)
*G06F 9/54* (2006.01)
(Continued)

(52) U.S. Cl.
CPC .............. *G06F 9/546* (2013.01); *G06F 9/542* (2013.01); *G06F 11/302* (2013.01); *G06F 40/205* (2020.01)

(58) Field of Classification Search
CPC ..................................................... G06F 9/541
See application file for complete search history.

(56) References Cited

U.S. PATENT DOCUMENTS

7,899,917 B2    3/2011  Chitre
9,003,043 B1 *  4/2015  Moranta ............. H04L 67/1097
                                                        709/227
(Continued)

OTHER PUBLICATIONS

Ke Wang, Network Payload-based Anomaly Detection and Content-based Alert Correlation. (Year: 2006).*

(Continued)

*Primary Examiner* — Lechi Truong
(74) *Attorney, Agent, or Firm* — Trellis IP Law Group, PC

(57) ABSTRACT

An example system and method facilitates operation of a networked software application, i.e., client application which communicates with a network resource (e.g., web service) during periods of intermittent network connectivity, by selectively intercepting and shredding and/or unshredding service response messages. In a specific embodiment, the example system includes one or more pluggable shredders and unshredders that are used to explode a complex REpresentational State Transfer (REST) payload into its constituent structured primitive objects for ease of consumption by the User Interface (UI) of the client application. The exploded, i.e., shredded response message payloads are stored in local cache, where the cached data is strategically structured as compared to the received REST payload. One or more unshredders selectively reconstruct one or more REST response message payloads if client reissues the corresponding REST request message while offline. Accordingly, the client need not alter its activities based on whether the client is online or offline. Instead the client may operate as if it is always online, and the system will provide one or (Continued)

more mock responses containing the last known data set for the scenario wherein the server cannot be reached, i.e., when the client is offline.

23 Claims, 7 Drawing Sheets

(51) Int. Cl.
*G06F 11/30* (2006.01)
*G06F 40/205* (2020.01)

(56) References Cited

U.S. PATENT DOCUMENTS

| | | | |
|---|---|---|---|
| 2004/0162886 A1* | 8/2004 | Ims | G06F 16/9574 709/213 |
| 2006/0004927 A1 | 1/2006 | Rehman | |
| 2008/0086540 A1 | 4/2008 | Scott | |
| 2011/0099617 A1* | 4/2011 | Ponnath | G06F 21/52 726/7 |
| 2012/0079056 A1* | 3/2012 | Turanyi | H04L 29/06 709/213 |
| 2015/0278281 A1* | 10/2015 | Zhang | G06F 16/2379 707/703 |
| 2016/0094497 A1* | 3/2016 | Javed | G06F 16/95 709/206 |
| 2016/0292742 A1* | 10/2016 | Kang | G06Q 30/0267 |
| 2017/0141926 A1* | 5/2017 | Xu | H04L 9/3247 |
| 2017/0185459 A1* | 6/2017 | Perkins | G06F 9/542 |
| 2020/0106860 A1 | 4/2020 | Sullivan | |

OTHER PUBLICATIONS

"Using the application cache" https://developer.mozilla.org/en-US/docs/Web/HTML/Using_the_application_cache—16 pages.
"Service Worker API" https://developer.mozilla.org/en-US/docs/Web/API/Service_Worker_API—7 pages.
"Service Workers" https://caniuse.com/#feat=serviceworkers—2 pages.
"Window.localStorage" https://developer.mozilla.org/en-US/docs/Web/API/Window/localStorage—4 pages.

* cited by examiner

SYSTEM FOR OFFLINE OBJECT BASED STORAGE AND MOCKING OF REST RESPONSES

CROSS REFERENCES TO RELATED APPLICATIONS

This application claims the benefit of U.S. Provisional Patent Application Ser. No. 62/741,135, entitled SYSTEM FOR OFFLINE OBJECT BASED STORAGE AND MOCKING OF REST RESPONSES, filed on Oct. 4, 2018, which is hereby incorporated by reference as if set forth in full in this application for all purposes.

This application is further related to U.S. Provisional Patent Application Ser. No. 62/739,536, entitled OFFLINE CLIENT REPLAY AND SYNC, filed on Oct. 1, 2018, which is hereby incorporated by reference as if set forth in full in this application for all purposes.

BACKGROUND

The present application relates to computing and more specifically to systems and methods for facilitating development and operation of networked software applications that can efficiently handle intermittent network connectivity.

Software mechanisms for accommodating intermittent or limited network connectivity are employed in various demanding applications, including mobile enterprise applications, automotive computing applications, and so on. Such applications often demand efficient mechanisms for accommodating network disconnection and reconnection scenarios.

For example, mobile apps used by certain field service workers may lose network connectivity over extended periods. Conventionally, a browser may locally cache some data for a given webpage or app, but the cached data may be of limited use for some needed software operations or functions.

For example, if the field worker must access other links or data not included in a given cached page, network connectivity must first be established. However, waiting for the mobile application to reconnect to the network may be time consuming and counterproductive.

SUMMARY

An example method facilitates efficient operation of a client software application in a networked computing environment during offline and online operation by selectively shredding and unshredding (also called de-shredding) message payloads. The example method includes selectively intercepting one or more request message responses from a network resource, the one or more request message responses having been issued by the network resource in response to one or more request messages issued by a client software application; shredding the one or more request message responses by parsing the one or more request message responses into one or more predetermined structured formats; storing each of the one or more predetermined structured formats in a local cache (which may include an object store); and issuing the one or more request message responses to the client software application by issuing respective one or more predetermined structured formats used to format data in one or more payloads of the one or more request message responses.

In a more specific embodiment, the predetermined structured format includes an organization of constituent structured primitive objects of each payload of the one or more request message responses. The step of selectively intercepting further includes: determining that the client software application is online; and intercepting the one or more request message responses when the client software application is online.

The example method may further include: determining that the client software application is offline; detecting one or more request messages issued by the client software application; and using the one or more predetermined structured formats and associated data to generate one or more mock responses to the one or more request messages; and issuing the one or more mock responses to the client software application.

The step of using the one or more predetermined structured formats may further include unshredding one or more of the predetermined structured formats into a format consistent with an original request message response.

Accordingly, certain embodiments discussed herein may be implemented via a system of pluggable shredders and unshredders that are used to selectively explode or unexplode (i.e., shred or unshred) a complex REST payload into its constituent structured primitive objects for ease of consumption by the UI of the client. The shredded messages are locally cached in a format that is more structured than if the whole REST payload had simply been cached. The unshredding facilitates reconstruction of a payload in cases when the client reissues a request whilst offline, such that the client need not make its own decisions about what to do based on the online/offline status. Instead, the client may operate as if it is always online. The system may provide a one or more mock responses to the request message(s), where the one or more mock responses contain the last known set of data for the scenario where the server (hosting the network resource) cannot be reached by the client, i.e., when the client is offline.

An example user device facilitates efficient operation of a client software application in a networked computing environment during offline and online operation. The user device for implementing a client software application in a networked computing environment comprises: a display for displaying user interface enabling a user to interact with the client software application; one or more processors coupled to the display and when executed operable for: enabling the client software application to receive one or more request messages through the user interface; enabling the display to display one or more request message responses, and the one or more request message responses are issued to the client software application by issuing respective one or more predetermined structured formats used to format data in one or more payloads of the one or more request message responses.

Furthermore, embodiments discussed herein provide a framework for transforming HTTP request/responses into structured data that is readily persisted and readily queried by client-side software, thereby enabling easy transformation between business objects and business logic.

A further understanding of the nature and the advantages of particular embodiments disclosed herein may be realized by reference of the remaining portions of the specification and the attached drawings.

DETAILED DESCRIPTION OF EMBODIMENTS

Figure 1:
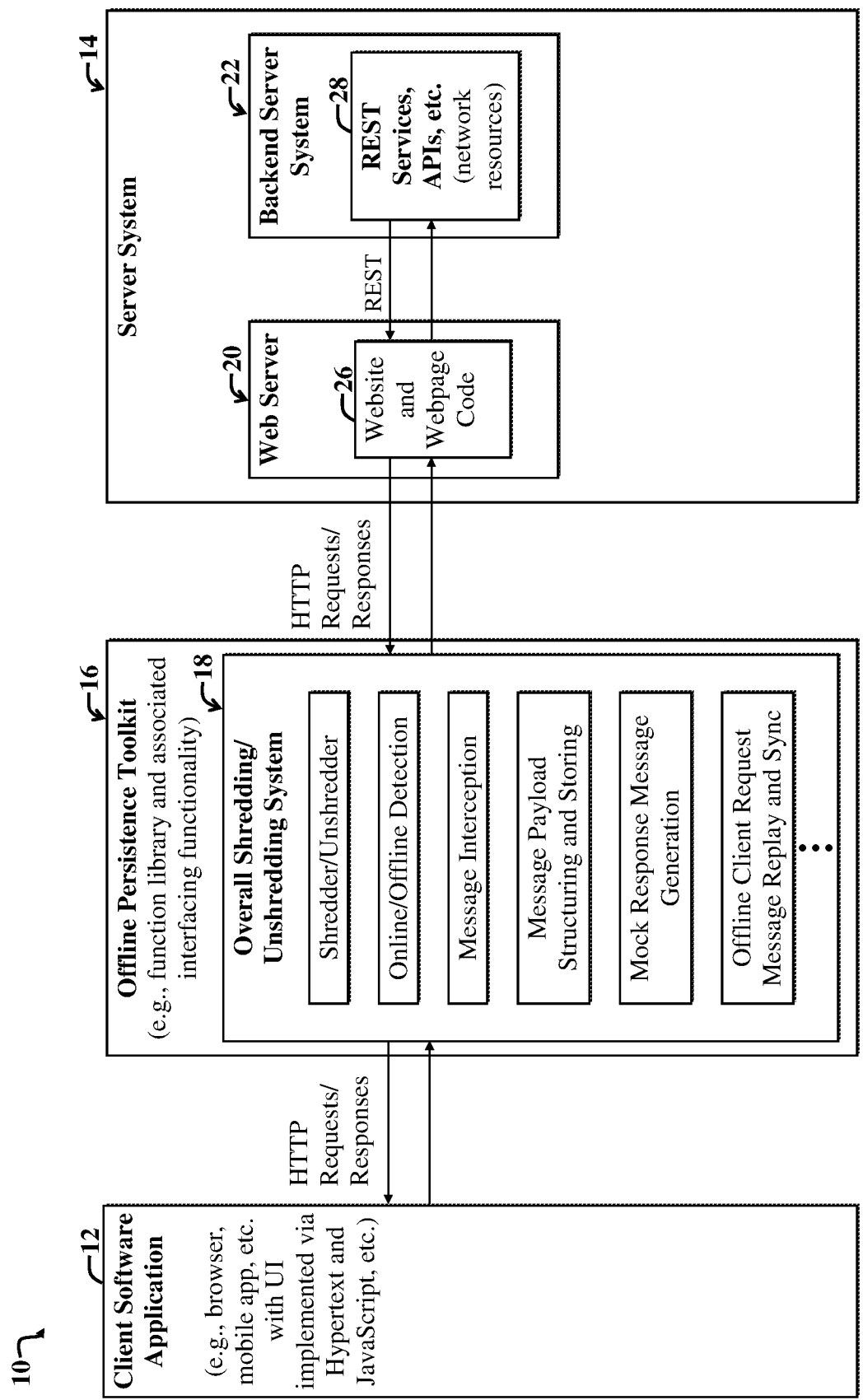
FIG. 1 is a block diagram showing a first example system and accompanying computing environment for facilitating selective shredding and unshredding of REpresentational State Transfer (REST) Application Programming Interface (API) or web service responses to request messages issued by a client software application (e.g., browser, also simply called the client herein) depending upon whether or not the client is offline or online.

For the purposes of the present discussion, a computing environment may be any collection of computing resources used to perform one or more tasks involving computer processing. A computer may be any processor in communication with a memory. A computing resource may be any component, mechanism, or capability or quantities thereof of a computing environment, including, but not limited to, processors, memories, software applications, user input devices, and output devices, servers, and so on.

An enterprise computing environment may be any computing environment used for a business or organization. An example enterprise computing environment includes various computing resources distributed across a network and may further include private and shared content on Intranet Web servers, databases, files on local hard discs or file servers, email systems, document management systems, portals, and so on.

A given software application may include (but not necessarily) constituent software applications or modules (e.g., services, functions, procedures, computing objects, etc.). Accordingly, the term "software application" may also include networked software applications or integrated groups thereof.

A software system may be any collection of computing resources implementing machine-readable instructions, i.e., computer code. Accordingly, the term "software system" may refer to a software application, and depending upon the context in which the term is used, may further refer to the accompanying computer(s) and associated computing resources used to run the software application.

Depending upon the context in which the term is used, a software system may further include hardware, firmware, and other computing resources enabling running of the software application. Note that certain software systems may include collections of disparate services, which are implemented in particular sequences in accordance with a process template and accompanying logic. Accordingly, the terms "software system," "system," and "software application" may be employed interchangeably herein to refer to modules or groups of modules or computing resources used for computer processing.

For the purposes of the present discussion, a server may be any computing resource, such as a computer and/or software that is adapted to provide content, e.g., data and/or functionality, to another computing resource or entity that requests it, i.e., the client. A client may be any computer or system that is adapted to receive content from another computer or system, called a server. A Service Oriented Architecture (SOA) server may be any server that is adapted to facilitate providing services accessible to one or more client computers coupled to a network.

An application server may be any server that includes computing resources for running software applications that may provide data and/or functionality to one or more client devices. An application server may back one or more web pages running on one or more web servers, wherein the web pages facilitate providing UI controls to enable a user of client device to use the client to interact with functionality afforded by the underlying application server and applications and/or data running thereon and/or stored thereby. Accordingly, an application server may be implemented via a software framework (and/or hardware that supports the software framework, depending upon the context in which the term is used) for providing computing resources for supporting the creation of and running of software applications, e.g., web applications, including web services, APIs, database applications, and so on, that provide data and/or functionality to other software applications, called client applications (or simply clients).

A networked computing environment may be any computing environment that includes intercommunicating computers, i.e., a computer network. Similarly, a networked software application may be computer code that is adapted to facilitate communicating with or otherwise using one or more computing resources, e.g., servers, via a network. Similarly, a networked software application may be any software application (e.g., a mobile app, desktop browser plugin, etc.) that communicates with one or more computing resources via a computer network.

A web service may be any computer code and associated functionality that is adapted to be called by an application or other service or process whose code is stored in a separate location (e.g., on another computer or memory storage location or device) from the software service and whose interface with the software service includes a Web Services Description Language (WSDL) interface.

Generally, web services, also simply called services herein, provide functionality, e.g., capabilities, that may be reused by different applications, processes, or web services (that may be distributed across a network), which access the functionality via a WSDL interface consistent with a description of the web service. A web services model may represent a loosely coupled integration model for allowing flexible integration of various network-distributed applications or processes.

A user interface may be any collection of hardware and/or software adapted to facilitate illustrating data and/or providing access to software functionality associated with the user interface. A software user interface may be any collection of one or more user interface display screen associated with software that may be displayed on a display of a computing device such as a user device or server device. A software UI is often characterized by a UI framework or architecture, which specifies an organization of data and functionality of a software application and which may further include features for navigating the software UI.

For clarity, certain well-known components, such as hard drives, processors, operating systems, power supplies, routers, the Internet, Internet Service Providers (ISPs), virtual machines, middleware, JavaServer Faces (JSF) frameworks and servlets, certain types of metadata service providers, runtime service connectors, persistence managers, metadata transformation utilities, authentication modules, identity providers, token validators, Asynchronous JavaScript and XML (AJAX) engines, backend databases, and so on, are not necessarily explicitly called out in the figures. However, those skilled in the art with access to the present teachings will know which components to implement and how to implement them to meet the needs of a given implementation.

FIG. 1 is a block diagram showing a first example system 10 and accompanying computing environment for facilitating selective shredding and unshredding of REpresentational State Transfer (REST) Application Programming Interface (API) or web service responses to request messages issued by a client software application (e.g., browser, also simply called the client herein) 12 depending upon whether or not the client 12 is offline or online.

The example system includes an offline persistence toolkit 16 interfacing the client 12 and a server system 14. The client 12 issues HTTP request messages to a computing resource 28 of a backend server system 12, which is part of a larger server system 14, e.g., a cloud. A web server 20 hosts a website 26 and associated web application (i.e., webpage code). The webpage code 26 facilitates generation of UI (e.g., based on HTML and JavaScript) presented on the client 12. User interactions with the client 12 through UI may generate events that result in issuance of the HTTP requests, which may include XHR (XML HTTP Request) requests employing JavaScript Object Notation (JSON) payloads.

Generally, when client 12 is online, i.e., connected to a network (such as the Internet) that enables the client to communicate with the server system 14, the request messages are routed to the REST service 28 via corresponding REST messages from the webpage code 26. The REST service 28 then issues responses, which are delivered back to the client 12.

When the client 12 transitions to offline status, e.g., the client 12 becomes disconnected from the associated network, an offline persistence toolkit 16 that interfaces the client 12 with the server system 14 facilitates handling client responses as though the offline persistent toolkit 16 is acting as the server system 14, e.g., by modeling server response messages (via mock responses) in response to intercepted request messages from the client application 12, as discussed more fully below.

The offline persistence toolkit 16 may be implemented client-side, i.e., on a client device on which the client 12 runs. In certain implementations, the offline persistence toolkit 16 runs as a plugin to the client software application 12.

The offline persistence toolkit 16 includes a message shredding and unshredding system 18 with functionality for selectively shredding incoming response messages from the server system 14. The response messages are shredded into a structured form that facilitates use by the client 12 and associated UI. Shredded messages may be cached via the shredding and unshredding system 18, thereby enabling unshredders of the system 18 to access the shredded messages and reconstruct them, e.g., so as to generate mock responses for delivery to the client 12 when the client 12 goes offline.

Note that for the purposes of the present discussion, a cache may be any means for local storage of data to facilitate a given software operation, task, or objective. Hence, a cache (as the term is used herein) may include stores of message metadata describing header information for request/response message pairs (e.g., local cache store); may include stores of shredded and structured message payload data (e.g., object store); may include stores of request and response message pairs that have not been shredded (e.g., synchronization log). Generally, all of such stores may be considered to represent so-called persistence storage. When data is placed on one of the local stores, it is said to be cached.

The shredding and unshredding system 18 may be implemented via one or more programming language classes and accompanying methods. The methods include code for detection, message interception, message payload structuring and storing, mock response message generation, offline client request message replay and synchronization, and so on.

Figure 2:
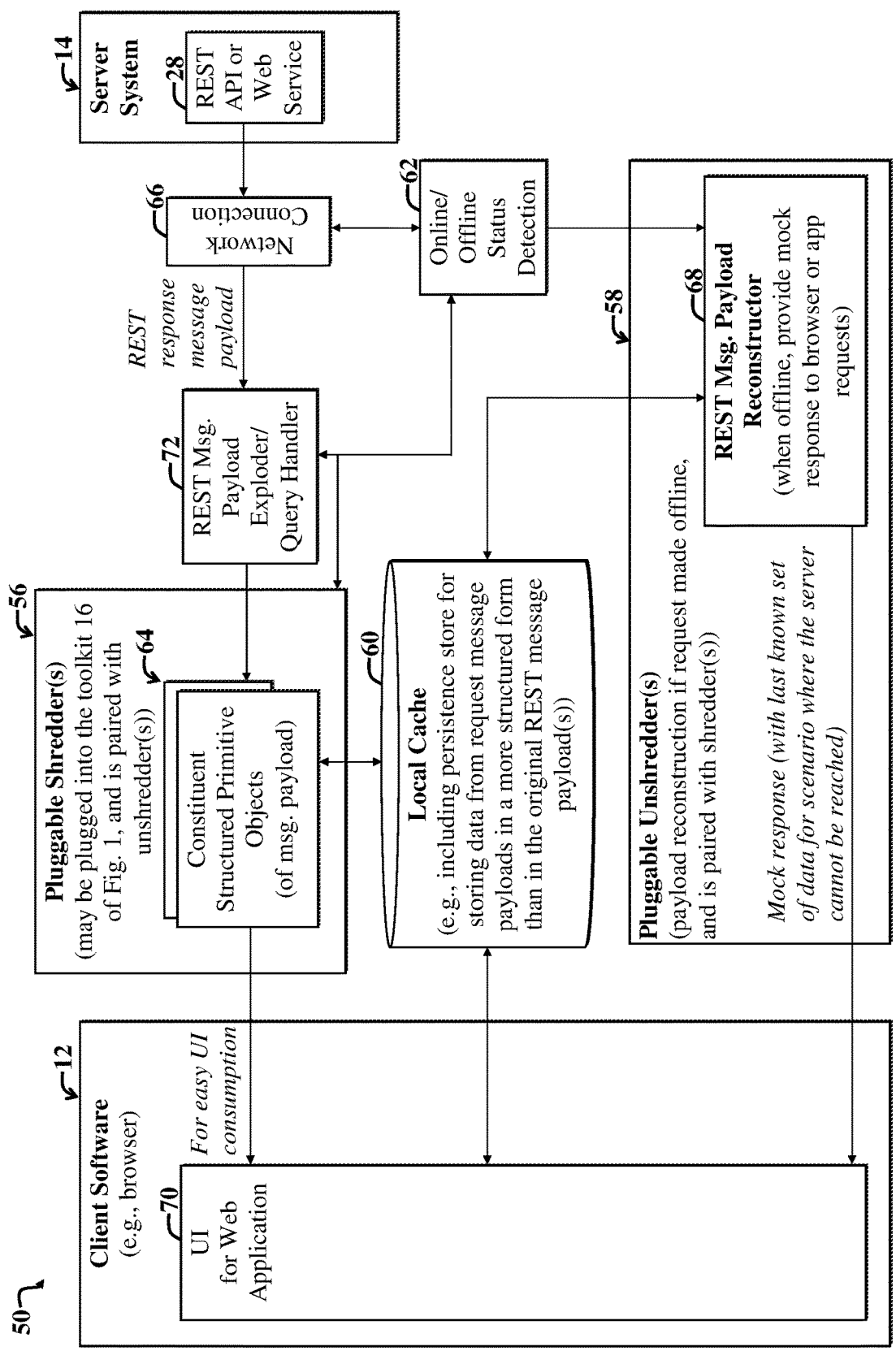
FIG. 2 is a block diagram showing a second example system and accompanying computing environment that further illustrates example details of an implementation of the offline persistence toolkit of FIG. 1, including pluggable shredders, unshredders, and a cache for storing structured data from shredded REST response message payloads.

FIG. 2 is a block diagram showing a second example system 50 and accompanying computing environment that further illustrates example details of an implementation of the offline persistence toolkit 16 of FIG. 1, including pluggable shredders 56, unshredders 58, and a local cache 60 for storing structured data from shredded REST response message payloads, etc., as discussed more fully below.

Note that in practice, the shredder 56 and unshredder 58 typically work in pairs, such that if one implements a shredder, it also implements an unshredder. Generally, the modules of FIG. 2 may be grouped differently than shown, and connections between modules may vary, without departing from the scope of the present teachings. For example, the shredder(s) and unshredder(s) 58 may be part of the same module. Furthermore, in certain implementations, the client software 12 need not communicate directly with local cache 60 or the pluggable unshredders 58, and may instead communicate with the offline persistence toolkit functionality 16 of FIG. 1 primarily via issuance of request messages that are intercepted via a persistence manager, as discussed more fully below with reference to FIG. 4.

In the present example embodiment, the client 12 is shown including a UI 70 which facilitates generation of request messages (e.g., responsive to user interaction with the UI 70 triggering events that then trigger request messages) and consumes corresponding request message responses returned back from the REST service 28 hosted by the server system 14.

In the present example embodiment, the client 12 may communicate, at least indirectly, with pluggable shredders 56, a local cache 60 and with pluggable unshredders 58. The example pluggable shredder 56 communicates with a REST message payload exploder 72, which implements functionality for exploding, i.e., shredding, incoming REST response messages and accompanying payloads when the client 12 is online. The shredding of a response message by the REST message payload exploder 72 results in constituent structure primitive objects 64.

In general, HTTP responses are sent through the shredder 56, which splits out associated JavaScript Object Notation (JSON) objects that are then persisted in the local cache 60, i.e., queryable local database. The payload exploder 72 implements a query handler that parses the message requests. The query handler 72 can use query parameters of latter incoming HTTP requests to query the local storage 60 as needed to selectively fulfill requests without needing to access the server system 14.

The online/offline status of the client 12 may be determined via an online/offline status detection module 62. Note what while in the present example embodiment the online/offline status detection module 62 is shown communicating with network connection functionality 66 to determine client online/offline status, that the online/offline status detection module 62 may also, or alternatively, communicate with the client 12, which may maintain its own online/offline status detection module that can inform the online/offline status detection module 62 as to whether or not the client 12 is online or offline.

The primitive or elementary objects 64 of the response message payload are structured, i.e., arranged in an organized format, and stored in local cache 60, and/or forwarded to the client UI 70 for easy consumption thereby. Note that the exact structure or format of the structured primitive objects 64 may be implementation specific and may vary, to meet the needs of a given implementation. Generally, the structure of the primitive objects 64 is chosen to facilitate enhanced performance of the client UI 70.

When the client 12 transitions to an offline status, i.e., the communications link between the client 12 and the server system 14 goes down, the client 12 may continue to act as though the client 12 is still online. In this case, one or more pluggable (as may be plugged into the offline persistent toolkit 16 of FIG. 1) unshredders 58 selectively intercept request messages from the client 12 and then return mock responses to the request messages back to the client 12.

The example unshredder 58 accesses shredded messages maintained in the local cache 60, and uses a REST message payload reconstructor to incorporate the shredded message payloads back into response messages, which are then delivered to the client 12 as mock responses.

Figure 3:
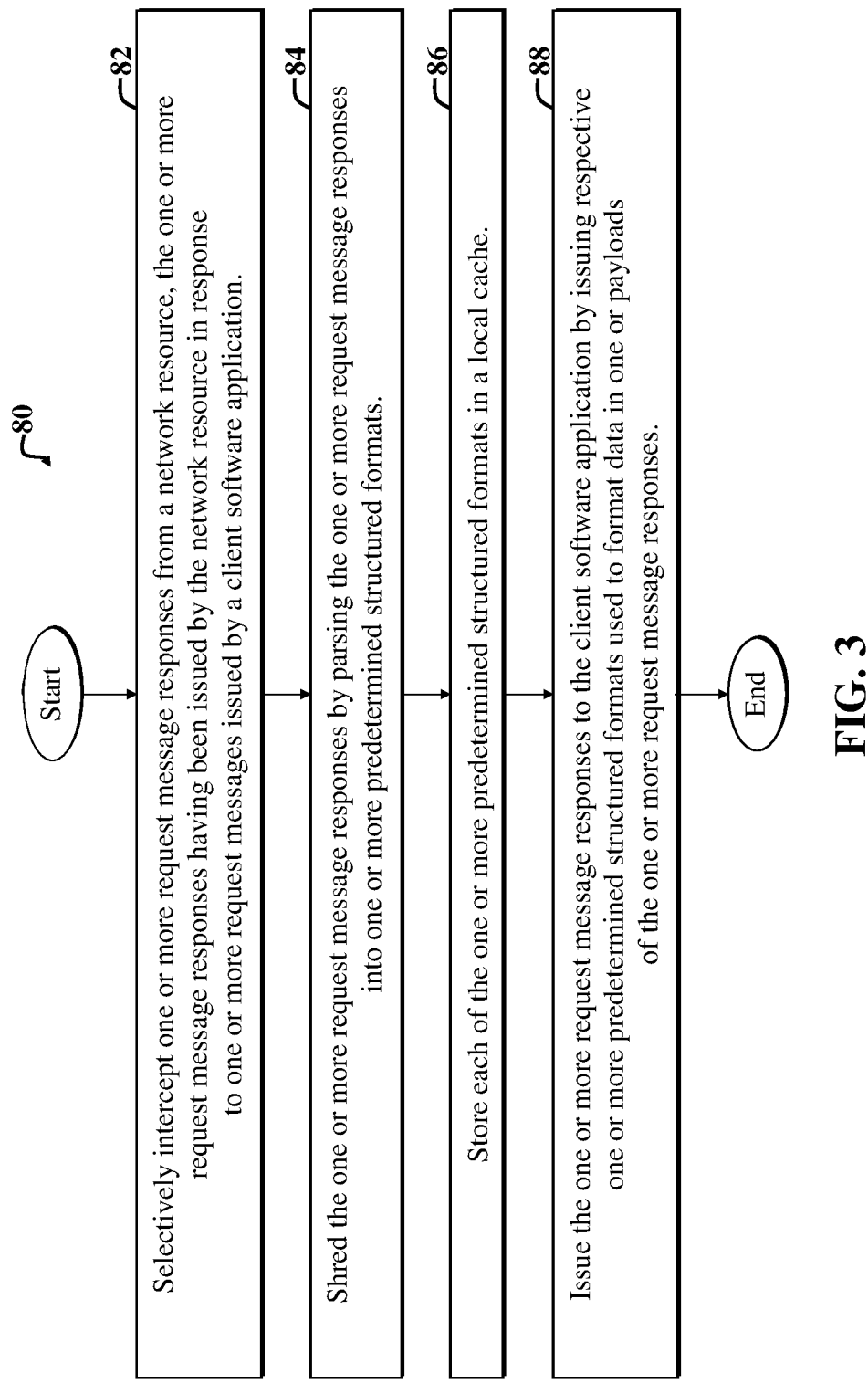
FIG. 3 is a flow diagram of a first example method usable with the embodiments of FIGS. 1-2.

FIG. 3 is a flow diagram of a first example method 80 usable with the embodiments of FIGS. 1-2. The example method 80 facilitates operation of a client software application, e.g., the client 12 of FIG. 1-2 in a networked computing environment.

With reference to FIGS. 2 and 3, the method 80 includes a first step 82, which involves selectively intercepting one or more request message responses from a network resource (e.g., the REST service 28 of FIG. 2), wherein the one or more request message responses have been issued by the network resource in response to one or more request messages issued by a client software application (e.g., the client 12 of FIG. 2).

A second step 84 includes shredding the one or more request message responses (e.g., by the REST message payload exploder 72 of FIG. 2) by parsing the one or more request message responses into one or more predetermined structured formats (e.g., corresponding to the structured primitive objects 64 of FIG. 2).

A third step 86 includes storing each of the one or more predetermined structured formats in a local cache (e.g., the cache 60 of FIG. 2).

A forth step 88 includes issuing the one or more request message responses to the client software application by issuing respective one or more predetermined structured formats used to format data in one or more payloads of the one or more request message responses. The predetermined structured format includes an organization of constituent structured primitive objects of each payload of the one or more request message responses.

Note that the method 80 may be altered, without departing from the scope of the present teachings. For example, the first step 82 may further include determining that the client software application is online; and intercepting the one or more request message responses when the client software application is online.

The example method 80 may further include using one or more pluggable unshredders 58, cache 60, and online/offline status detection module 62 of FIG. 2 to determine that the client software application is offline; detect one or more request messages issued by the client software application; use the one or more predetermined structured formats and associated data to generate one or more mock responses to the one or more request messages; and issue the one or more mock responses to the client software application. The step of using one or more predetermined structured responses may further include unshredding one or more of the predetermined structured formats into a format consistent with an original request message response.

Accordingly, the method 80 and associated variants may be implemented via a system of pluggable shredders and unshredders that are used to "explode" a complex REST payload into its constituent structured primitive objects for ease of consumption by the client UI. Local caches of the resultant structured data include structured data that is more structured that the original REST message payload. Unshredding enables reconstruction of a payload, e.g., when the client software application reissues a request when offline. Accordingly, the client application need not make its own decisions about what to do based on online or offline status, and instead may operate as if it is always online. The accompanying toolkit (e.g., the kit 16 of FIG. 1) will provide a mock response that contains the last know set of data for the scenario were the server cannot actually be reached.

Figure 4:
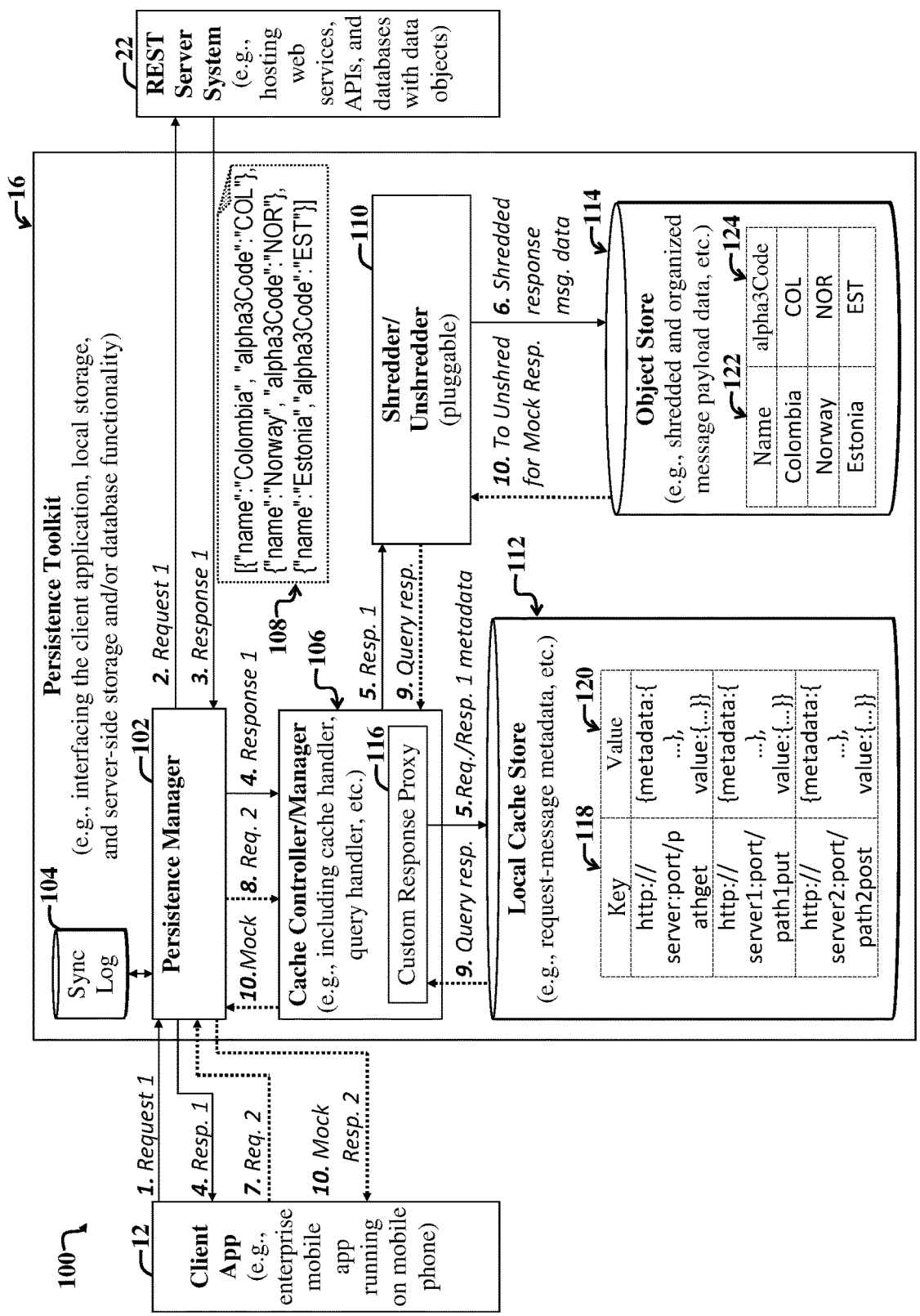
FIG. 4 is a block diagram showing a third example embodiment an implementation of the persistence toolkit of FIG. 1, which further illustrates example interactions between a client application and the persistence toolkit involving the generation of a mock response to a request message sent from the client application.

FIG. 4 is a block diagram showing a third example embodiment an implementation of the persistence toolkit 16 of FIG. 1, which further illustrates example interactions between a client application 12 and the persistence toolkit 16 involving the generation of a mock response to a request message (1.) sent from the client application 12.

In the present example embodiment, the client application 12 is shown communicating with a persistence manager 102 of the persistence toolkit 16. The persistence toolkit 16 further includes a cache controller (also called cache manager) 106, which communicates with the persistence manager 102, and further communicates with a shredder/unshredder module(s) 110 and a local cache store 112.

The shredder/unshredder 110 further communicates with a local object store 114. The persistence manager 102 may further communicate with a synchronization manager and associated sync log 104, when the persistence toolkit 16 is to synchronize with the REST server 22, as discussed more fully below.

In an example scenario, the client application 12 is just starting up and has yet to issue any request messages to the remote REST server system 22. The client application 12 may have code for accessing (e.g., retrieving, posting, updating, deleting, etc.) server-side data maintained via the REST server system 22. Note that in effect, the same code may access data of the object store 114 via REST calls (i.e., request messages) that may include operations for retrieving, positing, updating, deleting, etc., stored data. However, the client application 12 may be unaware of the difference between interacting with data of the object store 114 and interacting with data maintained remotely by the REST server system 22.

Currently, the client application 12 is online and able to communicate with the REST server system 22, e.g., by issuing requests thereto and receiving responses therefrom. Accordingly, the client application 12 sends an initial request message (1.) addressed to the REST server system 22. the persistence manager 102 of the persistence toolkit 16 then intercepts the message for handling.

The persistence manager 102 determines that the request message should be forwarded (2.) to the REST server system 22. This forwarding may occur after the persistence manager 102 has checked the local cache store 112 (via communications with the cache controller 106) to determine if a response to the request message could be generated from data that is already locally cached. This so-called cache-first strategy may be implemented by a custom response proxy module 116 included in (or in communication with) the cache controller 106.

Note that the custom response proxy 116 may implement other implementation specific functionality, without departing from the scope of the present teachings. For example, conflict resolution between data updates being made by the client application 12 and stored locally (e.g., in the object store 114) and data updates suggested by one or more response messages from the REST server system 22 may be implemented via the custom response proxy 116.

In the present example embodiment, the persistence manager forwards the request (2.) to the REST server system 22, which then responds (3.) with a message that includes a data payload 108, which includes information about a few countries.

The resulting response message (4.) is then passed by the persistence manager 102 to the cache controller 106 in preparation for updating of the local cache store 112 and object store 114 with data from the response message. The response (4.) may also be forwarded to the client application 12, which may occur before, during, or after updating of the local cache store 112 and object store 114, depending upon the needs of a given implementation.

Metadata (5.) of the response message, e.g., header information, such as Uniform Resource Locators (URLs) 118 and associated metadata 120, is included in the local cache store 112. In addition, the response message payload 108 is shredded from the response message (and separated from the header information 118, 120) and stored (6.) in the object store 114, e.g., as database rows and columns 122, 124.

Now, the response message payload 108 has been shredded and included in the object store 114, and the response message header information has been included in the local cache store 112. This information can now be used to selectively respond to some additional request messages.

For example, in the present example scenario, the client application 12 issues a second request message (7.) to the REST server system 22. However, this time, for the sake of discussion, suppose that the client application 12 is offline, or the REST server system 22 is otherwise not available.

The persistence manager 102 then uses the second request (8.) to check with the cache controller 106 to determine if a mock response can be generated for the second request message (8.) based on the request message. The cache controller 106 then queries (9.) the local cache store and shredder/unshredder 110 to determine if the request message matches a response message maintained among the local storage 112, 114.

If a match is detected, then data from the object store 114 is delivered to the shredder/unshredder 110 in preparation for unshredding and incorporation into a mock response message (10.) to be delivered to the client application 12.

The mock response message may be constructed by the custom response proxy 116 upon receipt of unshredded response messaged data from the shredder/unshredder 110 and corresponding header data from the local cache store 112.

Note that copies of the resulting mock response (10.) message and the initial response (4.) message may be time stamped and logged in the sync log 104 for selective replay to and synchronization with the REST server system 22 when the client application 12 and accompanying persistence toolkit 16 go online or otherwise become able to access sought resources of the REST server system 22.

In summary, assuming cache-first strategy (cacheFirst):

1. A request is made from the client application 12 to retrieve data from the backend REST server 22.
2. The request is intercepted by the persistence manager 102, which checks the cache store 112 for a match. But, since nothing exists in cache store 112 yet, the request is forwarded to the REST server 22.
3. The REST server 22 returns a response with a payload (e.g., message payload 108).
4. The response is intercepted by the persistence manager 102, e.g., for the purposes of local caching, etc.
5. The cache store 112 saves metadata (e.g., header information) for request/response message pairs (without the actual payload data). In addition, the cache controller 106 uses the shredder 110 to shred the response message and then store resulting individual records 122, 124 of the response in the object store 114.
6. While the cache controller/manager 106 is working, the response from the server 22 is returned to the client application. 12
7. Now another request is sent from the client application 12.
8. The request is intercepted by the persistence manager 102, which asks the cache controller 106 for a match.
9. The cache controller 106 then queries the cache store 112 for a match, and also asks the shredder/unshredder 110 for the message payload data from the object store 114. A mock response is then created using an unshredded version of the data 112, 124 in the object store 114.
10. The mock response is then returned to the client application 12.

Figure 5:
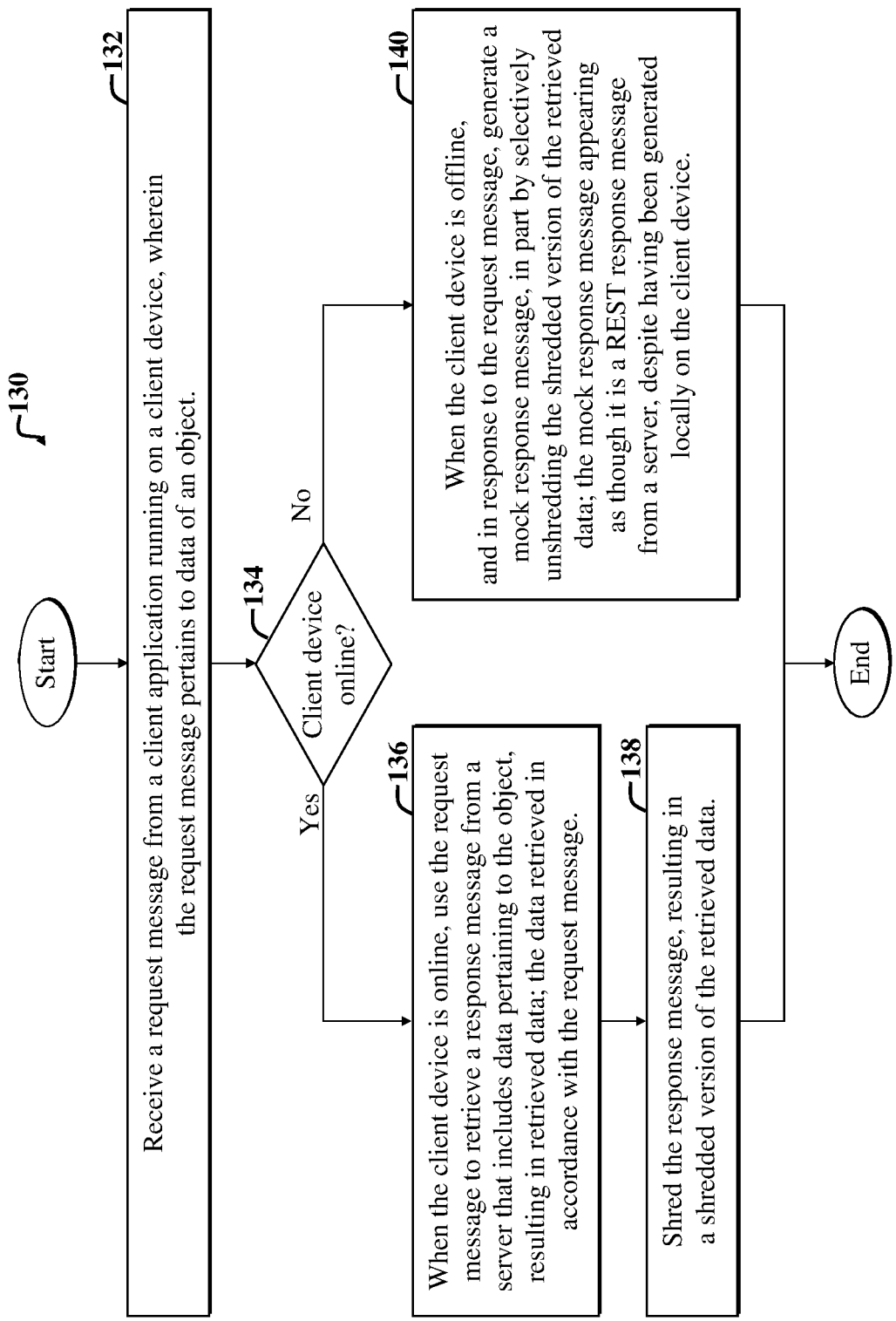
FIG. 5 is a flow diagram of a second example method usable with the embodiments of FIG. 1-4.

FIG. 5 is a flow diagram of a second example method 130 usable with the embodiments of FIG. 1-4. The second example method 130 facilitates offline operation of a client application, such as a mobile app.

The second example method 130 includes a first message-receiving step 132, includes receiving a request message from a client application (e.g., the application 12 of FIG. 4) running on a client device, wherein the request message pertains to data of an object (e.g., the data object represented by the message payload 108 and stored content 122, 124 of the object store 114 of FIG. 4).

Next, an online/offline determining step 134 includes determining if the client device and associated client application is online or offline.

In an online step 136, when the client device is online, the second example method 130 further includes using the request message to retrieve a response message from a server (e.g., the REST server system 22 of FIG. 4) that includes data pertaining to the object, resulting in retrieved data, wherein the data retrieved in accordance with and/or responsive to the request message.

After the online step 136, a shredding step 138 is performed, which involves shredding the response message, resulting in a shredded version of the retrieved data; and the storing the shredded version of the retrieved data locally on the client device.

In an offline step 140, when the device is offline, the method 130 involves (in response to the request message), a mock response message via the shredded version of the retrieved data (e.g., corresponding to data maintained in the object store 114 of FIG. 4), the mock response message appearing as though it is a REST response message from a server (e.g., the REST server 22 of FIG. 4).

Note that the second example method 130 may be modified, without departing from the scope of the present teachings. For example, the method 130 may further specify that the shredding step 138 further includes not only storing the shredded version of the retrieved data locally on the client device, but further includes storing the shredded version of the retrieved data in an object store of the client device.

Figure 6:
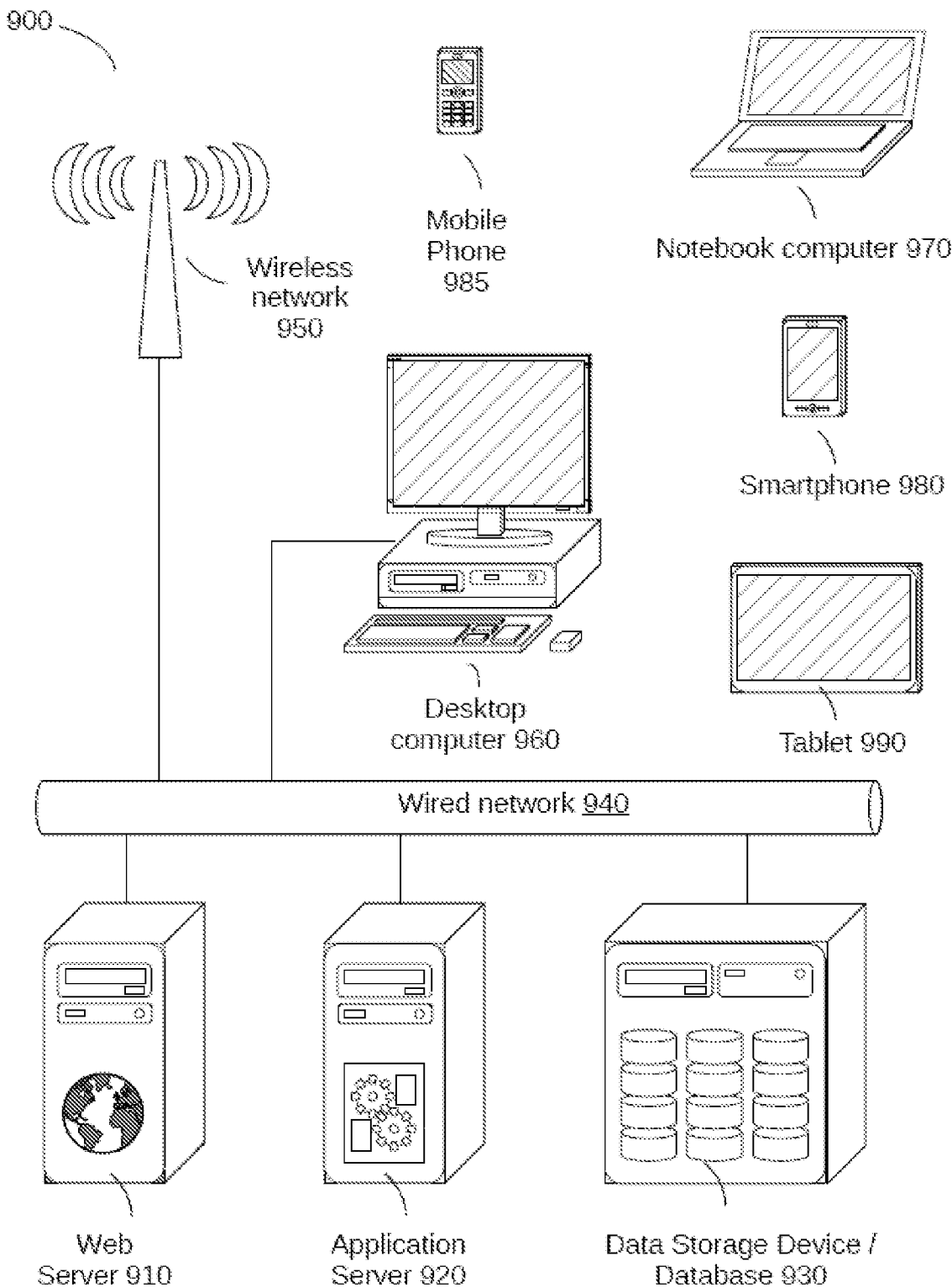
FIG. 6 is a general block diagram of a system and accompanying computing environment usable to implement the embodiments of FIGS. 1-3.

FIG. 6 is a general block diagram of a system 900 and accompanying computing environment usable to implement the embodiments of FIGS. 1-5. The example system 900 is capable of enabling efficient configuration and generation of dynamic UI display screens for web applications. Embodiments may be implemented as standalone applications (for example, residing in a user device) or as web-based applications implemented using a combination of client-side and server-side code.

The general system 900 includes user devices 960-990, including desktop computers 960, notebook computers 970, smartphones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as RSS feeds, of data related to enterprise operations.

An application server 920 operates one or more applications. The applications can be implemented as one or more scripts or programs written in any programming language, such as Java, C, C++, C #, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 920 are adapted to process input data and user computer requests and can store or retrieve data from data storage device or database 930. Database 930 stores data created and used by the data applications. In an embodiment, the database 930 includes a relational database that is adapted to store, update, and retrieve data in response to SQL format commands or other database query languages. Other embodiments may use unstructured data storage architectures and NoSQL (Not Only SQL) databases.

In an embodiment, the application server 920 includes one or more general-purpose computers capable of executing programs or scripts. In an embodiment, web server 910 is implemented as an application running on the one or more general-purpose computers. The web server 910 and application server 920 may be combined and executed on the same computers.

An electronic communication network 940-950 enables communication between user computers 960-990, web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system is one example for executing applications according to an embodiment of the invention. In another embodiment, application server 910, web server 920, and optionally database 930 can be combined into a single server computer application and system. In a further embodiment, virtualization and virtual machine applications may be used to implement one or more of the application server 910, web server 920, and database 930.

In still further embodiments, all or a portion of the web and application serving functions may be integrated into an application running on each of the user computers. For example, a JavaScript application on the user computer may be used to retrieve or analyze data and display portions of the applications.

Figure 7:
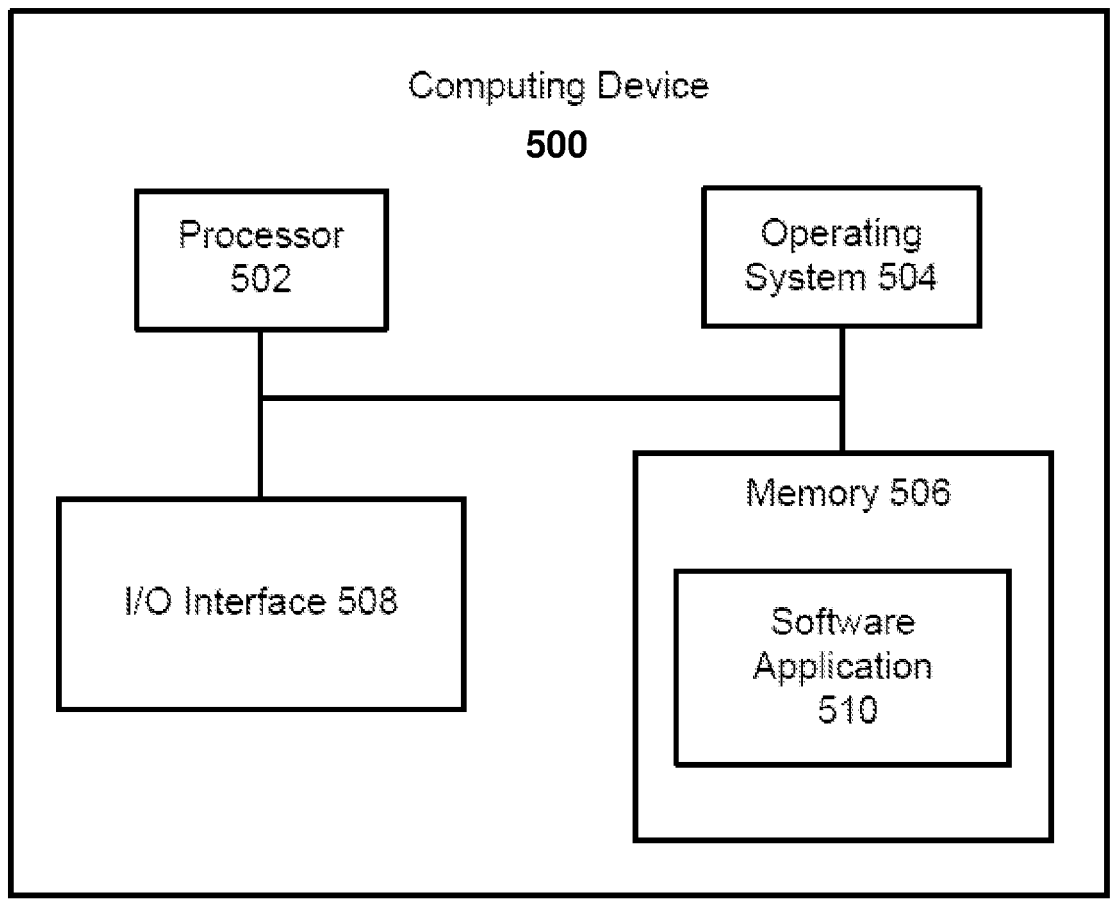
FIG. 7 is a general block diagram of a computing device usable to implement the embodiments of FIGS. 1-3.

FIG. 7 illustrates a block diagram of an example computing device 500, which may be used for implementations described herein. For example, computing device 500 may be used to implement server devices 910, 920 of FIG. 6 as well as to perform the method implementations described herein; and/or to implement user devices 985,960,970,980, 990 of FIG. 6 as well as to perform the method implementations described herein. In some implementations, computing device 500 may include a processor 502, an operating system 504, a memory 506, and an input/output (I/O) interface 508 such as a display. In various implementations, processor 502 may be used to implement various functions and features described herein, as well as to perform the method implementations described herein. While processor 502 is described as performing implementations described herein, any suitable component or combination of components of system 500 or any suitable processor or processors associated with system 500 or any suitable system may perform the steps described. Implementations described herein may be carried out on a user device, on a server, or a combination of both.

Computing device 500 also includes a software application 510, which may be stored on memory 506 or on any other suitable storage location or computer-readable medium. Software application 510 provides instructions that enable processor 502 to perform the functions described herein and other functions. The components of computing device 500 may be implemented by one or more processors or any combination of hardware devices, as well as any combination of hardware, software, firmware, etc.

For ease of illustration, FIG. 7 shows one block for each of processor 502, operating system 504, memory 506, I/O interface 508, and software application 510. These blocks 502, 504, 506, 508, and 510 may represent multiple processors, operating systems, memories, I/O interfaces, and software applications. In various implementations, computing device 500 may not have all of the components shown and/or may have other elements including other types of components instead of, or in addition to, those shown herein.

Although the description has been described with respect to particular embodiments thereof, these particular embodiments are merely illustrative, and not restrictive. For example, while certain embodiments discussed herein are used to selectively shred or unshred REST response messages responsive to client-issued REST request messages, embodiments are not limited thereto. Other types of networked software architectures (other than REST) and associated messages may benefit from methods for implementing selective shredding and unshredding as discussed herein, without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a non-transitory medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory tangible processor-readable medium including instructions executable by one or more processors, and when executed operable for:

determining insufficient data in a local cache to generate a potential response to a first request message issued by a client device;

in response to determining the insufficient data to generate a potential response, forwarding the first request message to a network resource;

selectively intercepting a first request message response from the network resource, the first request message response including retrieved data pertaining to an object and having been issued by the network resource in response to the first request message;

shredding the first request message response by parsing the first request message response into a predetermined structured format used to format data in payload of the first request message response, resulting in a shredded version of the retrieved data;

storing the shredded version of the retrieved data on the client device in the local cache;

issuing the first request message response to the client device by issuing the predetermined structured format used to format data in the payload of the first request message response;

receiving a second request message from the client device, wherein the second request message pertains to the retrieved data of the object;

determining if the client device is online or offline; and when the client device is offline and in response to the second request message, generating a mock response message via the shredded version of the retrieved data, the mock response message appearing as though it is a second request message response from the network resource.

2. The tangible processor-readable medium of claim 1, wherein the predetermined structured format includes an organization of constituent structured primitive objects of each payload of the first request message response.

3. The tangible processor-readable medium of claim 1, wherein selectively intercepting further includes:

determining that the client device is online; and intercepting the first request message response when the client device is online.

4. The tangible processor-readable medium of claim 1, wherein using further includes unshredding the predetermined structured format into a format consistent with the first request message response.

5. The tangible processor-readable medium of claim 1, wherein the network resource includes a representational State Transfer (REST) Application Programming Interface (API) or service.

6. The tangible processor-readable medium of claim 5, wherein the first request message response includes a REST response message.

7. The tangible processor-readable medium of claim 1, wherein
storing of the shredded version of the retrieved data is in an object store of the client device.

8. The tangible processor-readable medium of claim 7, wherein the client device includes a mobile computing device, and wherein the first request message includes a REST request message to create, retrieve, update, or delete data of a computing object.

9. A method for facilitating operation of a client software application in a networked computing environment, the method comprising:
determining insufficient data in a local cache to generate a potential response to a first request message issued by a client device;
in response to determining the insufficient data to generate a potential response, forwarding the first request message to a network resource;
selectively intercepting a first request message response from the network resource, the first request message response including retrieved data pertaining to an object and having been issued by the network resource in response to the first request message;
shredding the first request message response by parsing the first request message response into a predetermined structured format used to format data in payload of the first request message response, resulting in a shredded version of the retrieved data;
storing the shredded version of the retrieved data on the client device in a local cache;
issuing the first request message response to the client device by issuing the predetermined structured format used to format data in the payload of the first request message response;
receiving a second request message from the client device, wherein the second request message pertains to the retrieved data of the object;
determining if the client device is online or offline; and
when the client device is offline and in response to the second request message, generating a mock response message via the shredded version of the retrieved data, the mock response message appearing as though it is a second request message response from the network resource.

10. The method of claim 9, wherein the predetermined structured format includes an organization of constituent structured primitive objects of the payload of the first request message response.

11. The method of claim 9, wherein selectively intercepting further includes:
determining that the client device is online; and
intercepting the first request message response when the client device is online.

12. The method of claim 9, wherein using further includes unshredding the predetermined structured format into a format consistent with the first request message response.

13. The method of claim 9, wherein the network resource includes a representational State Transfer (REST) Application Programming Interface (API) or service.

14. The method of claim 13, wherein the first request message response includes a REST response message.

15. The method of claim 9, wherein
storing the shredded version of the retrieved data is in an object store of the client device.

16. An apparatus comprising:
one or more processors; and
logic encoded in one or more tangible media for execution by the one or more processors and when executed operable for:
determining insufficient data in a local cache to generate a potential response to a first request message issued by a client device;
in response to determining the insufficient data to generate a potential response, forwarding the first request message to a network resource;
selectively intercepting a first request message response from a network resource, the first request message response including retrieved data pertaining to an object and having been issued by the network resource in response to the first request message;
shredding the first request message response by parsing the first request message response into a predetermined structured format used to format data in payload of the first request message response, resulting in a shredded version of the retrieved data, wherein the predetermined structured format includes an organization of constituent structured primitive objects of a payload of the one first request message response;
storing the shredded version of the retrieved data on the client device; in a local cache
receiving a second request message from the client device, wherein the second request message pertains to the retrieved data of the object;
determining if the client device is online or offline; and
when the client device is offline and in response to the second request message, generating a mock response message via the shredded version of the retrieved data, the mock response message appearing as though it is a second request message response from the network resource.

17. A user device for implementing a client software application in a networked computing environment, comprising:
a display for displaying a user interface enabling a user to interact with the client software application of a client device;
one or more processors coupled to the display, and when executed operable for:
enabling the client software application to receive one or more request messages through the user interface;
determining insufficient data in a local cache to generate a potential response to one or more first request messages issued by a client software application;
in response to determining the insufficient data to generate a potential response, forwarding the one or more first request messages to a network resource;
intercepting one or more first request message responses from the network resource, one or more first request message responses including retrieved data pertaining to an object and having been issued by the network resource in response to the once or more first request messages;

shredding the one ore more first request message responses, resulting in one or more shredded versions of the retrieved data;

storing the one or more shredded versions of the retrieved data on the client device in a local cache;

receiving a second request message from the client device, wherein the second request message pertains to the retrieved data of the object;

determining if the client device is online or offline; and when the client device is offline enabling the display to display one or more mock message responses, via the one or more shredded versions of the retrieved data, the one or more mock message responses appearing as though they are one or more second request message responses from the network resource wherein the one or more mock message responses are issued to the client software application by issuing respective one or more predetermined structured formats used to format data in one or more payloads of the one or more mock message responses.

18. The user device of claim 17, wherein the one or more predetermined structured formats include an organization of constituent structured primitive objects of each payload of the one or more first request message responses.

19. The user device of claim 17, wherein:

it is determined whether or not the client software application is online; and the one or more first request message responses is intercepted from a network resource when the client software application is online.

20. The user device of claim 19, wherein the network resource includes a representational State Transfer (REST) Application Programming Interface (API) or service.

21. The user device of claim 20, wherein the one or more first request message responses include one or more REST response messages.

22. The user device of claim 17, wherein one or more of the predetermined structured formats are unshredded into a format consistent with an original request message response.

23. The user device of claim 17, further comprising:

an object store for storing the one or more shredded versions of the retrieved data.

* * * * *

UNITED STATES PATENT AND TRADEMARK OFFICE
CERTIFICATE OF CORRECTION

PATENT NO. : 10,877,825 B2  
APPLICATION NO. : 16/439420  
DATED : December 29, 2020  
INVENTOR(S) : Sullivan et al.

It is certified that error appears in the above-identified patent and that said Letters Patent is hereby corrected as shown below:

In the Specification

In Column 3, Line 21, delete "FIG. 1-4." and insert -- FIGS. 1-4. --, therefor.

In Column 7, Line 41, delete "FIG. 1-2" and insert -- FIGS. 1-2 --, therefor.

In Column 10, Line 46, delete "FIG. 1-4." and insert -- FIGS. 1-4. --, therefor.

In Column 11, Line 53, after "can" insert -- be --.

In the Claims

In Column 15, Line 6, in Claim 5, delete "representational" and insert -- REpresentational --, therefor.

In Column 16, Line 2, in Claim 13, delete "representational" and insert -- REpresentational --, therefor.

In Column 16, Line 32, in Claim 16, after "the" delete "one".

In Column 16, Line 66, in Claim 17, delete "once" and insert -- one --, therefor.

In Column 17, Line 1, in Claim 17, delete "ore" and insert -- or --, therefor.

In Column 18, Line 10, in Claim 20, delete "representational" and insert -- REpresentational --, therefor.

Signed and Sealed this  
Twenty-ninth Day of June, 2021

Drew Hirshfeld  
*Performing the Functions and Duties of the*  
*Under Secretary of Commerce for Intellectual Property and*  
*Director of the United States Patent and Trademark Office*